Patented Apr. 6, 1943

2,315,484

UNITED STATES PATENT OFFICE 2,315,484

PLASTER BANDAGE

George E. Hardy, Stelton, N. J., assignor to Johnson & Johnson, New Brunswick, N. J., a corporation of New Jersey No Drawing. Application August 23, 1941, Serial No. 408,132

4 Claims. (Cl. 128—91)

This invention relates to bandages and more particularly to plaster of Paris bandages.

Heretofore it has been the general practice in the manufacture of this type of bandage to apply the plaster to gauze, muslin, or some suitable open mesh fabric in dry powdered form, or by compounding the powdered plaster of Paris to a workable mass with a suitable adhesive and then applying it to the fabric. The first manner of producing a bandage of this type obviously results in a bandage having many disadvantages. It is messy and the plaster of Paris adheres to the fabric only unevenly causing irregular, lumpy, and non-uniform distribution when the bandage is immersed in water preparatory to making a cast therefrom, also much of the plaster is lost in handling both before immersing in water and during immersion.

The second manner of producing a bandage is disclosed in the Mathey Patent No. 1,726,403, issued August 27, 1929, and involves the making of a paste from the plaster, and then coating or impregnating the fabric with this mass, after which the coated fabric is permitted to dry.

The present invention is directed toward an improvement of this latter type of bandage, and purposes to provide an improved hard coated plaster of Paris bandage of this type that may be manufactured economically without the necessity of intricate and difficultly controlled expensive equipment.

It is also within the aspects of this invention to provide a plaster of Paris bandage of this type in which the time of preparation is reduced, the loss of plaster upon immersion in water is minimized, and to produce a bandage which has sufficient strength, is non-toxic, and otherwise satisfactory in use.

In producing a satisfactory bandage of this type, one of the chief problems is to provide a suitable bonding agent which will not preset the plaster of Paris and which will retain the plaster of Paris upon the gauze or other backing material in such a manner that the bandages may be rolled if desired for transportation and storage, without the loss of an appreciable amount of plaster, and which will also retain the plaster upon the backing when the plaster is immersed in water, prior to casting, without hindering the absorption of water, and without affecting the setting time of the plaster.

Many attempts have been made in the past to provide a suitable bonding agent, but so far as is known, all prior attempts, while satisfactory in some respects, leave something to be desired either from the manufacturing viewpoint, cost, or results.

As previously stated, the bonding agent should have sufficient adherent qualities and furthermore should be non-toxic, offer substantial resistance to the effects of ageing, and should be soluble in non-aqueous solvents before and while being compounded with plaster of Paris as well as after it is applied and dried with the plaster upon the backing, and to some extent, at least, be slightly soluble in water, or at least be readily dispersible in water after it has been dried upon the backing.

It has been found that proteins, and particularly proteins of the prolamin type or group such as zeins, provide such a suitable bonding agent in that they have sufficient adherent qualities, are soluble in alcohol for coating purposes and after drying are soluble to some extent in organic solvents, and may be slightly soluble in water, or may be dispersed thereby when the bandage is wetted just prior to applying. By alcohol is meant alcohol as defined in the United States pharmacopoeia or commercial alcohol which usually contains about 5% water as distinguished from absolute alcohol which is customarily so expressed and is, of course, 100% alcohol. Prolamine proteins are, of course, soluble in 92% alcohol but such alcohol contains too much water for best results when the proteins are used as a bonding agent in plaster of Paris bandages. One particularly suitable protein in this group or classification is "mazein." Mazein is a well known protein and is one manufacturer's trade name for its particular brand of zein which is a protein derived from corn and is classified as belonging to the prolamine group. In accordance with this invention plaster of Paris, powdered, is combined with a non-aqueous solution of such a bonding agent, and this mass is then spread or coated on crinoline or some other suitable fabric. The coated crinoline or bandage is then allowed to dry in the air until the solvent, such as alcohol, has evaporated leaving the crinoline coated or incrusted with the plaster of Paris and the bonding agent. Obviously this procedure does not cause pre-setting of the plaster. This bandage may then be rolled, without appreciable loss of plaster, for storage and transportation purposes if desired, or the bandage may be packed in flat sheets or strips. When it is desired to use the bandage, it is immersed in water for a matter of a few seconds, and the plaster of Paris becomes wetted and a workable mass due to the fact that the bonding agent is readily dispersible in water.

A typical commercial formula which has provided a satisfactory bandage is as follows:

2 lbs. 12 oz. of "mazein."
65 lbs. 4 oz. of alcohol.
130 lbs. of plaster of Paris.

One practical method of compounding which has provided a satisfactory bandage is to prepare a "mazein" solution by making a 10% "mazein" solution in alcohol by dissolving the "mazein" in the alcohol preferably by heating indirectly after which the mixture is allowed to cool. Satisfactory results are also obtainable by varying the 10% "mazein" from 1% to 12% depending upon the desired characteristics of the final bandage. After cooling, the solution may be decanted if desired. The foregoing solution of "mazein" and alcohol, when decanted, may contain approximately 3% total solids. Here again satisfactory results may be obtained from a final solution containing 10% to 3% solids. The approximate 3% solution, however, seems to be very satisfactory for average use. Into 25 lbs. of this "mazein" solution 50 to 65 lbs. of plaster of Paris is mixed. The amount of plaster may be varied slightly to cause the resulting mixture to have the desired consistency for spreading or coating on the fabric backing. The coating or spread may be accomplished in any of the recognized ways such as by spreading or calendering.

It will be appreciated from the foregoing that by the use of alcohol, a solvent with a fairly low boiling point, it can readily be removed by air currents alone, thus eliminating the use of expensive drying equipment. Furthermore, the mixture is devoid of an excessive amount of water, and it is not possible for the plaster of Paris or any appreciable portion thereof to become preset. Because of the latter two characteristics, the bandage, as heretofore described, is admirably suited for economic continuous production.

It will be obvious to those skilled in the art that additional ingredients may be incorporated in the mixture to control the setting time and/or to give certain characteristics to the plaster, and that other slight variations may be made from the foregoing disclosure without departing from the spirit and scope of this invention as defined in the appended claims.

I claim:

1. A plaster of Paris bandage comprising a strip of backing material having a coating adhering thereto, said coating comprising plaster of Paris and a protein bonding agent of the prolamin group which is soluble to some extent in organic solvents and also partially soluble or dispersible in water.

2. A plaster of Paris bandage comprising a strip of backing material having a coating of plaster of Paris bonded thereto with "mazein."

3. A plaster of Paris bandage comprising a strip of backing material having a coating adhering thereto said coating comprising plaster of Paris and a 1%–12% solution of a zein and alcohol prior to drying.

4. A plaster of Paris bandage comprising a strip of backing material having a coating adhering thereto, said coating comprising prior to drying an alcohol solution of "mazein" and plaster of Paris in the proportions of 25 lbs. of a 10% solution of "mazein" and alcohol and 50–65 lbs. of plaster of Paris.

GEORGE E. HARDY.